United States Patent

[11] 3,581,195

| [72] | Inventor | Robert L. Jepsen<br>Los Altos, Calif. |
|---|---|---|
| [21] | Appl. No. | 735,695 |
| [22] | Filed | June 10, 1968 |
| [45] | Patented | May 25, 1971 |
| [73] | Assignee | Varian Associates<br>Palo Alto, Calif. |

[54] DETECTION OF VACUUM LEAKS BY GAS IONIZATION METHOD AND APPARATUS PROVIDING DECREASED VACUUM RECOVERY TIME
6 Claims, 3 Drawing Figs.

| [52] | U.S. Cl. | 324/33 |
|---|---|---|
| [51] | Int. Cl. | G01n 27/62 |
| [50] | Field of Search | 324/33 |

[56] References Cited
UNITED STATES PATENTS

| 2,735,062 | 2/1956 | Striker | 324/33 |
|---|---|---|---|
| 2,797,385 | 6/1957 | Miles | 324/33 |
| 2,814,018 | 11/1957 | Zemany | 324/33 |
| 2,972,716 | 2/1961 | Morgan | 324/33 |
| 3,058,057 | 10/1962 | Frost | 324/33 |
| 3,070,992 | 1/1963 | Nemeth | 324/33X |
| 3,356,937 | 12/1967 | Watters | 324/33 |

*Primary Examiner*—Gerard R. Strecker
*Attorneys*—William J. Nolan and Leon F. Herbert ABSTRACT: A vacuum leak detecting method and apparatus is disclosed. An evacuated vacuum envelope structure to be tested for leaks is probed exteriorly with a jet of probe gas, such as helium. A certain fractional proportion of probe gas constituent which leaks through the probed vacuum envelope structure is ionized by a leak detector apparatus connected in gas communication with the structure being tested. The ionized probe gas constituent is collected to produce an ion current signal. The ion current signal is monitored to obtain a measure of the partial pressure of the probe gas constituent for detecting leaks. The fractional proportion of the probe gas which is ionized is varied inversely with the partial pressure of the probe gas constituent, whereby reemission of ionically pumped gas within the pressure measuring system is minimized, in use, to decrease the recovery time of the leak detector in its high sensitivity range. In one embodiment of the present invention, a comparator circuit is provided for comparing the amplitude of the ion current signal with a reference signal to derive a control signal for controlling the intensity of a ionizing bema of electrons utilized to ionize the probe gas constituent.

INVENTOR.
ROBERT L. JEPSEN
BY
Wm J Nolan
ATTORNEY

DETECTION OF VACUUM LEAKS BY GAS IONIZATION METHOD AND APPARATUS PROVIDING DECREASED VACUUM RECOVERY TIME

DESCRIPTION OF THE PRIOR ART

Heretofore, leak detectors have been built wherein an extremely sensitive ion gauge was connected in gas communication with the vacuum system to be leak checked. A stream of electrons in the ion gauge bombarded a sample portion of the gas in the system to ionize the gas including the probe gas constituent, if any, for example, helium. The ions were then formed into a beam and passed through a mass spectrometer which selected only the ionized probe gas constituent. These ions were detected to give a measure of the partial pressure of the probe gas constituent. A suitable partial pressure gauge, useful as a mass spectrometer leak detector, is described and claimed in copending U.S. Pat. application Ser. No. 539,951 filed Apr. 4, 1966, now U.S. Pat. No. 3,435,334.

While use of such a partial pressure gauge as a leak detector has extremely high sensitivity, permitting measurements of leak rates as low as $10^{112}$ standard cc's per second, such a high range of sensitivity introduces recovery time problems. More specifically, the partial pressure gauge, in collecting the ions for detecting the partial pressure of the probe gas, causes a substantial amount of pumping of the probe gas. For example, ions of the probe gas are buried in the ion current collecting electrode when measuring the ion current. They are also buried in other electrode structures such as the beam defining slit structures and in the ion accelerating electrode structures. At relatively high pressure ranges, for example, in pressure ranges above $10^{110}$ Torr, the collected and intercepted ion current is relatively high causing a substantial number of the ions to be buried in the ion collector structure and other structures. As the partial pressure of the probe gas tends to decrease after a leak has been detected, the buried gas is reemitted into the partial pressure gauge structure where it is again ionized and again collected as ion current. As a result, the recovery time, i.e., the time required for the partial pressure gauge to recover to the base pressure of the system, is on the order of hours. This generally makes the extremely high sensitivity of such a partial pressure gauge unusable for leak detection.

SUMMARY OF THE PRESENT INVENTION

The principal object of the present invention is the provision of an improved vacuum leak detecting method and apparatus.

One feature of the present invention is the provision, in a vacuum leak detecting method and apparatus, of the step of and means for varying the ionized fractional proportion of probe gas constituent inversely with the partial pressure of the probe gas constituent, whereby reemission of ionically pumped probe gas within the pressure measuring system is reduced sufficiently that the recovery time is reduced to an acceptable value for leak detector in its high sensitivity range.

Another feature of the present invention is the same as the preceding feature wherein the probe gas constituent is ionized by bombardment with a stream of electrons and wherein the fractional proportion of ionized probe gas is varied by varying the current of the ionizing stream of electrons.

Another feature of the present invention is the same as any one or more of the preceding features including a comparator for comparing the amplitude of the ion current of the ionized probe gas with a reference quantity to derive a control signal for controlling the ionized fractional proportion of probe gas constituent.

Another feature of the present invention is the same as the preceding feature wherein the control signal controls the intensity of the ionizing electron stream to control the fractional proportion of ionized probe gas.

Other features and advantages of the present invention become apparent upon a perusal of the following specification taken in connection with the accompanying drawings wherein:

DESCRIPTION OF THE PREFERRED EMBODIMENTS

Figure 1:
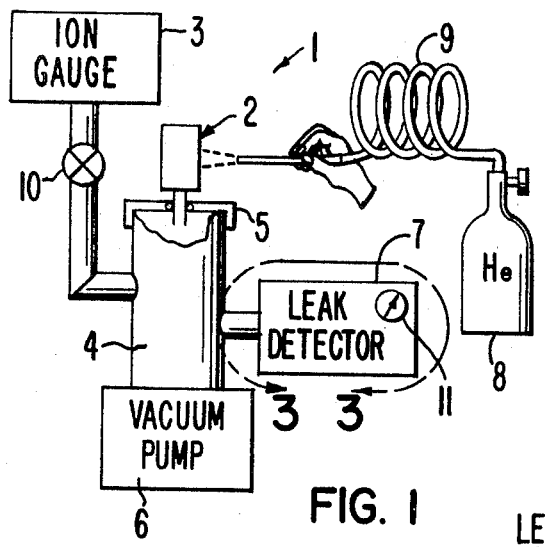
FIG. 1 is a schematic diagram, partly in block diagram form, of a leak detector system incorporating features of the present invention.

Referring now to FIg. 1, there is shown a leak detecting system 1. The system 1 includes a vacuum envelope structure 2 which is to be checked for leaks. Envelope 2 is connected to a vacuum manifold 4 via a vacuum tight quick disconnect flange assembly 5. A vacuum pump 6 of the type which expels gas from the system such as a mechanical pump or diffusion pump, is connected to one output port of the manifold 4 for evacuating the manifold 4 and the envelope 2 to be leak checked. An ion gauge 3 such as a Penning gauge or hot filament ionization gauge is connected to manifold 4 via valve 10. A leak detector 7 is connected in gas communication with the manifold 4 for measuring the partial pressure of the probe gas constituent, such as helium, which is caused to leak through leaks in the envelope 2 into the evacuated system 1. Envelope 2 is checked for leaks by probing the envelope 2 with a jet of probe gas such as helium, derived from a source of helium 8 via suitable tubulation 9.

Figure 2:
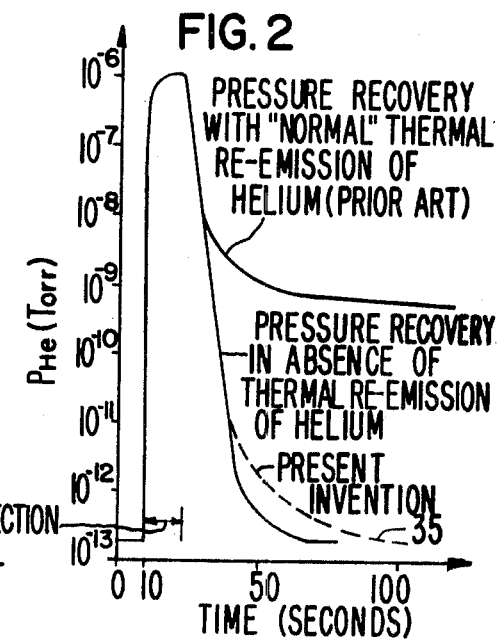
FIG. 2 is a plot of partial pressure, $P_P$, of probe gas versus time depicting recovery times for the prior art and for the leak detector of the present invention.

Briefly, in use, the operator connects the envelope 2 into the manifold 4 and exhausts the system via vacuum pump 6. When the total pressure is less than 1 Torr, the partial pressure of the probe gas should be $10^{16}$ Torr, and it is then safe to turn on the partial pressure gauge in the leak detector 7. At this time, the ion gauge 3 is valved off via valve 10 to prevent thermal reemission of probe gas from the ion gauge 3 from entering the manifold 4. The operator then probes the envelope 2 with a jet of probe gas. Upon encountering a leak in the envelope 2, the probe gas leaks into the vacuum system 1 and is detected as a sudden increase in the partial pressure of the probe gas constituent by the leak detector 7. The leak detector 7 includes an indicator 11 which indicates to the operator the sudden increase in partial pressure of the probe gas constituent as shown in FIG. 2. The operator then knows that there is a leak and he knows the approximate position of the leak by noting the position of the probe at the time of the sudden increase of partial pressure. After a given envelope 2 has been leak checked, the manifold 4 is valved off from the leak detector 7, ion gauge 3 and vacuum pump 6. The envelope 2 is then sealed and removed from the manifold 4 and replaced by a successive envelope 2 to be checked. The pump 6 is then opened into the manifold 4 and valve 10 is opened to permit a measurement of the total pressure in the manifold 4.

Figure 3:
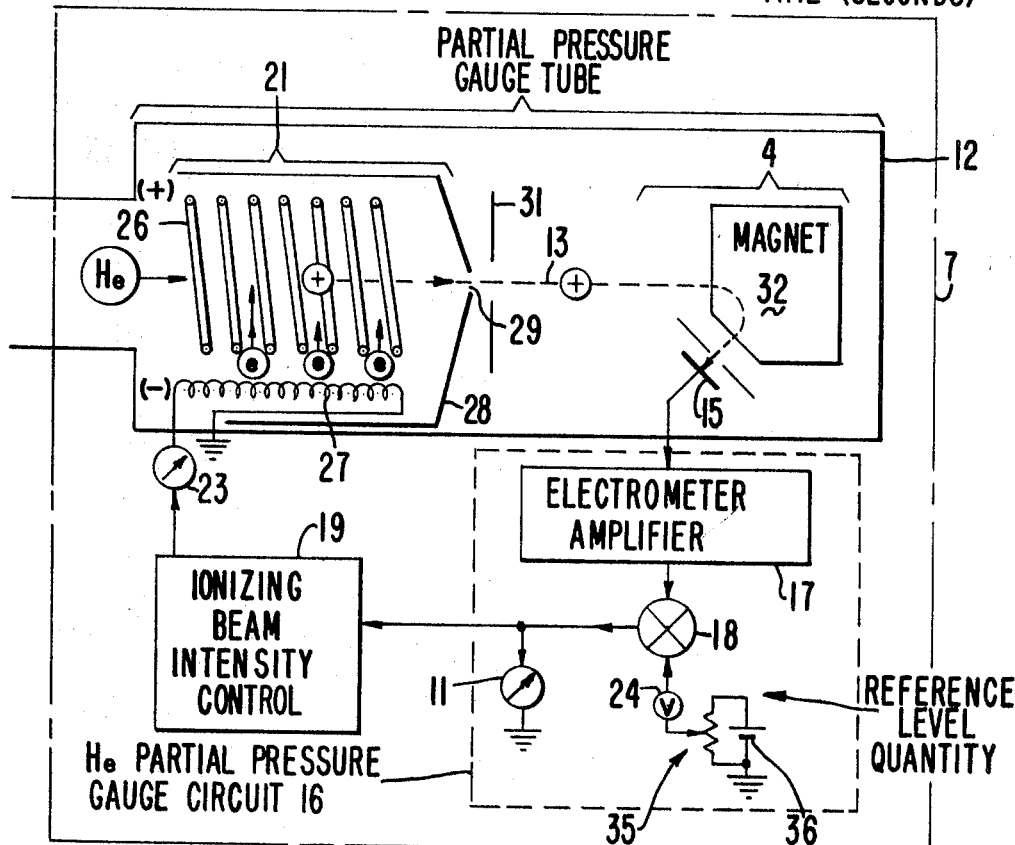
FIG. 3 is a schematic line diagram partly in block diagram form, depicting a leak detector circuit incorporating features of the present invention.

Referring now to FIG. 3, there is shown a leak detector 7 incorporating features of the present invention. More specifically, the leak detector 7 includes a partial pressure gauge tube 12 connected in gas communication with the manifold 4. The gauge tube 12 ionizes a sample of the gas in the system including the probe gas constituent, if any, and projects a beam of these ions through a mass spectrometer type magnetic ion selector 14, tuned for the atomic mass units of the probe gas constituent, to an ion collector electrode 15. The detected ion current is fed through a partial pressure gauge circuit 16 for giving an indication of the partial pressure of the probe gas constituent within the evacuated system 1. More specifically, the ion current signal is fed to an electrometer amplifier 17 which amplifies the ion current signal to produce an output signal which is fed to one input of a comparator 18 wherein the amplitude of the ion current signal is compared with a reference level signal which may be varied in discrete increments or which may be fixed at a certain intensity. The output of the comparator 18 is fed to an ionizing beam intensity control 19 for controlling the intensity of the ionizing beam of the ion source portion 21 of the partial pressure gauge 12. A meter 23 is arranged in the output circuit of the ionizing beam intensity control circuit 19 for measuring an output quantity determinative of the ionizing beam intensity. A meter 24 is provided in the input to the comparator 18 for measuring and indicating the reference level quantity. A meter 11 is provided for measuring the output of the comparator 18. A combination of the readings of meters 11 and 24 gives an indication of the probe gas ion current. For a given ionizing electron beam intensity, the resultant probe gas ion beam current measurement, as collected by ion beam collector 15, is a measurement of the partial pressure of the probe gas constituent.

The ion source 21 of the partial pressure gauge tube 12 includes a gas permeable cage-shaped electrode structure 26 which is operated at a suitable anode potential. A filamentary thermionic emitter 27, operating at cathode potential, is disposed outside the cage electrode 26 and extends axially thereof. Electrons emitted from the filamentary emitter 27 pass into the cage electrode structure 26 wherein they bombard gaseous constituents of the gas within the evacuated system 2 being leak checked. The electron beam ionizes the gaseous constituents, including the probe gas constituent, to form positive ions within the cage 26. A cup-shaped extractor electrode 28, operating at a suitable negative potential with respect to the cage electrode structure 26, is centrally apertured at 29 for extracting positive ions out of the cage electrode structure 26 and forming the extracted ions into the beam 13. A beam defining slit 31 is disposed on the beam path 13 for shaping the cross-sectional dimensions of the beam 13 by shaving off unwanted ions. The beam 13, having a certain predetermined beam voltage as determined by the potential between the extractor electrode 28 and the anode 26, passes into a magnetic mass analyzing section 14 including, for example, a magnet 32 for separating the ions 13 according to their charge-to-mass ratio. In particular, a suitable probe gas is helium which has a relatively low mass. The strength of the magnetic field produced by magnet 32 is chosen to have such a value so as to focus the helium ions within the beam 13 onto the collector electrode 15, whereas other ions having different charge-to-mass ratio are focused by the magnet 32 at other locations which are not detected. Thus, the ion current collected by collector electrode 15 is the ion current corresponding to the ionized probe gas constituent. A suitable partial pressure gauge tube 12 is commercially available from Varian Associates of Palo Alto as model 974-0035. Such a gauge tube 12 is also described in the previously mentioned U.S. Pat. No. 3,435,334. The partial pressure gauge tube 12 is capable of measuring helium partial pressures down to the range between $10^{113}$ and $10^{112}$ Torr as indicated in FIG. 2.

In operation, the envelope 2 that is to be checked is probed with the jet of probe gas. As the envelope 2 is probed with the probe gas, the operator monitors the leak detector 7 and observes the partial pressure indications of the probe gas constituent. When a leak is encountered, the probe gas passes through the leak and causes the partial pressure of the probe gas constituent to rise abruptly in the evacuated system and in the interior of the partial pressure gauge tube 12. With a certain ionizing beam intensity, as monitored at meter 23, the ion current of the ion beam 13 will rise abruptly producing a sudden increase in the indication of the partial pressure of the probe gas constituent, as determined from readings of meters 11, 23, and 24. The operator then removes the probe gas from the suspected leak and the partial pressure within the evacuated system levels off at some maximum pressure for example, $10^{16}$ Torr, as indicated in FIG. 2. After a few seconds, the partial pressure begins to decrease as the vacuum pump 6 lowers the pressure within the evacuated system.

If the ionizing beam intensity is not decreased during the rapid increase in partial pressure of the probe gas constituent, the ion current collected at collector 15 rapidly increases by many decades over that value of ion current collected in the low pressure regime. More specifically, the collected ion current would be proportional to the partial pressure and, thus, would suddenly increase from a very low value to a value which was approximately 1,000,000 times higher. This sudden increase in the number of helium ions reaching the collector 15 and other electrodes greatly increases the number of helium atoms buried in the collector structure 15 and other electrodes. As the partial pressure of the helium probe gas starts to increase, as compared, in comparator 18, to the predetermined reference level quantity such as reference voltage measured by meter 24 and derived via potentiometer 35 from voltage source 36, an error signal is obtained in the output of comparator 18.

The operator may form a feedback part of the closed loop system by manually decreasing the ionizing beam intensity, in accordance with the amplitude of the error signal indicated at 11, such as by decreasing the heater current to the filamentary emitter 27. Alternatively, the error signal output of comparator 18 may be employed as the control input signal to the ionizing beam intensity control 19 for automatically controlling the intensity of the ionizing electron beam in the ion source 21.

By reducing the fractional proportion of probe gas which is ionized in ion source 21, the number of probe gas ions buried in the various electrodes of the system is greatly reduced as compared to a system wherein the ionizing beam intensity is not decreased with a sudden increase in partial pressure of the probe gas. Consequently, thermal reemission of probe gas is greatly reduced as indicated by curve 35 of FIG. 2. Therefore, the leak detection interval is greatly reduced to on the order of a few seconds instead of several minutes or hours obtained with the prior art system as indicated in FIG. 2.

For a leak sufficiently large to cause the base pressure for He to rise to $10^{16}$ Torr, the ultimate base pressure, in the absence of directing a jet of He against the leak, would probably be in the $10^{112}$ to $10^{111}$ Torr, range due to the normal concentration of He in the atmosphere as it would normally leak from the atmosphere into the system. However, by surrounding the envelope 2 to be tested with a He free atmosphere, such as argon, the He partial pressure, in the absence of directing a He jet against the leak, should fall to below the detectable limit, i.e., below $10^{113}$ Torr.

It is contemplated that several alternative types of comparators 18 may be employed. For example, the comparator 18 may include an amplitude sensing network comprising a limit switch in combination with a meter such that when the input signal to the comparator 18 reaches a predetermined reference level as determined by the setting of the position of a limit switch, or by the setting of a reference voltage, an output is obtained which is fed to the ionizing beam intensity control 19 to cause the beam intensity to be decreased by one decade or the like. In such a case, the dead zone for the comparator 18 is relatively wide, namely, one decade.

Alternatively, the dead zone for the comparator 18 may be narrowed to an extremely small amount such that the collected ion current 15 is maintained precisely at some predetermined reference level as determined by a reference input voltage derived from the potentiometer 35 and voltage source 36.

The ionizing beam intensity control 19 controls the intensity of the ionizing beam, in one embodiment, by controlling the heating current to the filamentary thermionic emitter 27. Alternatively, a separate control grid electrode could be provided between the emitter 27 and the cage 26 not shown. The ionizing beam intensity control signal would be applied to this control electrode for controlling the intensity of the beam projected into the cage anode 26, in the conventional manner of a beam control electrode.

Since many changes could be made in the above construction and many apparently widely different embodiments of this invention could be made without departing from the scope thereof, it is intended that the matter contained in the above description or shown in the accompanying drawings shall be interpreted as illustrative and not in a limiting sense.

I claim:

1. A method for detecting with a probe gas vacuum leaks in an evacuated vacuum envelope structure comprising the steps of ionizing a fractional proportion of the probe gas constituent of the gases within the vacuum envelope structure, collecting the ionized probe gas constituent to derive an ion current signal, monitoring the ion current signal to derive a measure of the partial pressure of the probe gas constituent within said structure, exposing the exterior of the evacuated vacuum envelope structure to said probe gas to increase the partial pressure of said gas within said structure if a leak is present in said structure, and decreasing the ionization of said fractional proportion of probe gas constituent with an increase in the measured partial pressure of the probe gas constituent to reduce the number of reemittable ions pumped by the pressure measuring system whereby reemission of ionically pumped probe gas constituent within the system is minimized in use to decrease the recovery time of the leak detector in the high sensitivity range, the step of decreasing the ionization of said fractional proportion of probe gas constituent including the steps of comparing the amplitude of the ion current signal with a reference level signal which is maintained constant for said comparison to derive a control signal indicative of said increase, and decreasing the ionization of said fractional proportion of probe gas constituent responsive to said control signal.

2. The method of claim 1 wherein the step of ionizing the probe gas constituent includes the step of bombarding the neutral probe gas constituent with a stream of electrons, and wherein the step of decreasing the fractional proportion of ionized probe gas constituent includes the step of reducing the electron current of the ionizing stream of electrons with an increase in the measured partial pressure of the probe gas constituent.

3. A leak detector apparatus comprising means for ionizing a fractional proportion of a probe gas constituent of the gases within an evacuated system including an evacuated envelope structure to be tested for vacuum leaks, means for collecting the ionized probe gas constituent to derive an ion current signal, means for monitoring the ion current signal to derive a measure of the partial pressure of the probe gas constituent within said structure, means for exposing the exterior of the evacuated envelope to said probe gas, and means for decreasing the ionization of said fractional proportion of probe gas with an increase in the partial pressure of the probe gas indicative of a leak in said envelope structure to reduce the number of reemittable ions pumped by the pressure measuring system whereby reemission of ionically pumped probe gas within the pressure measuring portion of the apparatus is minimized in use to decrease the recovery time of the leak detector in the high sensitivity range, said means for decreasing the ionization of the probe gas with an increase in the partial pressure of the probe gas including means for comparing the amplitude of the ion current signal with a reference level signal which is maintained constant for said comparison to derive a control signal indicative of said increase and means responsive to the control signal by decreasing the ionized fractional proportion of probe gas constituent.

4. The apparatus of claim 3 wherein said means for ionizing a fractional proportion of the probe gas constituent includes, means for producing an ionizing stream of electrons for bombarding the probe gas constituent within the evacuated system, and wherein said means for decreasing the ionized fractional proportion of probe gas includes means for decreasing the current of the ionizing electron stream.

5. The apparatus of claim 4 wherein said ionizing means includes, a cage electrode structure for surrounding a region of space within which the probe gas constituent is to be ionized by the electron stream, and said means for producing the electron stream includes, a filamentary thermionic electron emitter disposed externally of said cage electrode and operated at a negative potential relative to said cage electrode for projecting the electron stream into said cage through its sidewalls, and means for supplying heating current to said thermionic emitter.

6. The apparatus of claim 5 wherein said means for decreasing the ionizing electron stream includes, means for decreasing the heating current supplied from said supply means to said thermionic filamentary emitter.